(12) United States Patent
Clifford et al.

(10) Patent No.: US 9,507,764 B2
(45) Date of Patent: Nov. 29, 2016

(54) COMPUTERISED DATA ENTRY FORM PROCESSING

(71) Applicant: Face Recording and Measurement Systems Ltd, Nottingham (GB)

(72) Inventors: Paul Clifford, London (GB); Mark Robinson, Nottinghamshire (GB); Toby Rogers, Nottingham (GB)

(73) Assignee: Face Recording and Measurment Systems Ltd., Nottingham (GB)

( * ) Notice: Subject to any disclaimer, the term of this patent is extended or adjusted under 35 U.S.C. 154(b) by 47 days.

(21) Appl. No.: 14/177,013

(22) Filed: Feb. 10, 2014

(65) Prior Publication Data

US 2014/0229815 A1 Aug. 14, 2014

(30) Foreign Application Priority Data

Feb. 11, 2013 (GB) .................................. 1302387.4

(51) Int. Cl.
*G06F 17/22* (2006.01)
*G06F 17/24* (2006.01)
*G06F 17/30* (2006.01)

(52) U.S. Cl.
CPC ......... *G06F 17/243* (2013.01); *G06F 17/2247* (2013.01); *G06F 17/30404* (2013.01)

(58) Field of Classification Search
CPC ............. G06F 17/243; G06F 17/2247; G06F 17/2229; G06F 17/30404; G06F 17/30867
See application file for complete search history.

(56) References Cited

U.S. PATENT DOCUMENTS

| | | | |
|---|---|---|---|
| 5,299,305 A | 3/1994 | Oomae et al. | |
| 5,721,940 A | 2/1998 | Luther et al. | |
| 8,103,962 B2 * | 1/2012 | Embley | G06F 17/243 715/763 |
| 2002/0099671 A1 * | 7/2002 | Mastin Crosbie | G06F 17/30867 705/500 |
| 2002/0103827 A1 * | 8/2002 | Sesek | G06F 17/243 715/224 |
| 2005/0015381 A1 * | 1/2005 | Clifford | G06F 17/30589 |
| 2006/0235691 A1 * | 10/2006 | Tomasic | G06F 3/0481 704/257 |

(Continued)

FOREIGN PATENT DOCUMENTS

| | | |
|---|---|---|
| GB | 2293667 A | 3/1996 |
| GB | 2293697 A | 3/1996 |
| GB | 2398143 A | 11/2004 |

OTHER PUBLICATIONS

Ted Padova and Angie Okamoto, PDF Forms Using Acrobat and LiveCycle Designer Bible, 2009, Wiley Publishing, p. 5, 6, 39, 60, 102, 174, 212, 213, 236, 238, 346, 444, 445, 576, 809, 921, 1013 and 1014.*
UK Search Report for GB1302387.4 dated Aug. 16, 2013 (3 pgs.).

*Primary Examiner* — Maikhanh Nguyen
(74) *Attorney, Agent, or Firm* — Wolf, Greenfield & Sacks, P.C.

(57) ABSTRACT

A system for processing multiple forms, wherein each form comprises at least one data input field and each data input field is configured to enable a respondent to enter input data into the form, the system configured to process a multi-character expression comprising:
one or more domain characters representing a domain; and one or more field characters representing at least one data input field of the form, wherein the one or more domain characters is indicative of variations in one or more of:
data input fields in the form;
discrete values of possible data inputs; and
validation logic associated with the at least one data input field.

16 Claims, 20 Drawing Sheets

| Data entry fields present in forms of particular type and domain | | Domain | | | |
|---|---|---|---|---|---|
| | | NHS | Hospital 1 | Hospital 2 | Hospital 3 |
| Form type | Registration form | Name Gender Age Address | | Name Gender Age Address Height | |
| | Prescription form | Drug Quantity Dose | | | |
| | Assessment form | Symptom Severity Diagnosis | Symptom Severity temperature Diagnosis | | Symptom Severity Heart-rate Diagnosis |

(56) References Cited

U.S. PATENT DOCUMENTS

2007/0130511 A1 6/2007 Roberge et al.

2008/0235567 A1* 9/2008 Raj .................. G06F 17/243
715/226

* cited by examiner

Figure 1a

| Data entry fields present in forms of particular type and domain | | Domain | | | |
|---|---|---|---|---|---|
| | | NHS | Hospital 1 | Hospital 2 | Hospital 3 |
| Form type | Registration form | Name<br>Gender<br>Age<br>Address | | Name<br>Gender<br>Age<br>Address<br>Height | |
| | Prescription form | Drug<br>Quantity<br>Dose | | | |
| | Assessment form | Symptom<br>Severity<br>Diagnosis | Symptom<br>Severity<br>temperature<br>Diagnosis | | Symptom<br>Severity<br>Heart-rate<br>Diagnosis |

Figure 1b

| I₁ | I₂ | I₃ | I₄ | I₅ | Interpretation |
|---|---|---|---|---|---|
| x. | | | | | Domain 'x' |
| 0. | | | | | Global domain NHS |
| 1. | | | | | Local Domain 'Hospital 1' |
| 2. | | | | | Local Domain 'Hospital 2' |
| 3. | | | | | Local Domain 'Hospital 3' |
| #. | x. | | | | Form type 'x' |
| #. | 1. | | | | Form type Registration |
| #. | 2. | | | | Form type Prescription |
| #. | 3. | | | | Form type Assessment |
| #. | #. | x. | | | form instance 'x' |
| #. | #. | 1. | | | form instance 1 |
| #. | #. | 2. | | | form instance 2 |
| #. | #. | 3. | | | form instance 3 |
| #. | #. | #. | x. | | data input field 'x' |
| #. | 1. | #. | 1. | | data input field name |
| #. | 1. | #. | 2. | | data input field gender |
| #. | 1. | #. | 3. | | data input field age |
| 2. | 1. | #. | 4. | | data input field address |
| #. | 2. | #. | 1. | | data input field Drug |
| #. | 2. | #. | 2. | | data input field Quantity |
| #. | 2. | #. | 3. | | data input field Dose |
| #. | 3. | #. | 1. | | data input field Symptom |
| #. | 3. | #. | 2. | | data input field Severity |
| #. | 3. | #. | 3. | | data input field Diagnosis |
| 1. | 3. | #. | 4. | | data input field Temperature |
| 3. | 3. | #. | 4. | | data input field Heart rate |

Figure 1c

| I₁ | I₂ | I₃ | I₄ | I₅ | Interpretation |
|---|---|---|---|---|---|
| #. | 1. | #. | x. | y. | Response 'y' to data field 'x' |
| #. | 1. | #. | 2. | 1. | Male |
| #. | 1. | #. | 2. | 2. | female |
| #. | 1. | #. | 3. | 16. | Age 16 years |
| #. | 1. | #. | 3. | 17. | Age 16 years |
| #. | 1. | #. | 3. | 18. | Age 18 years |
| #. | 1. | #. | 3. | 19. | Age 19 years |
| #. | 1. | #. | 3. | 20. | Age 20 years |
| #. | 1. | #. | 1. | x. | Pointer to name string 'x' |
| 2. | 1. | #. | 4. | x. | Pointer to address string 'x' |

Figure 1d

| I₁ | I₂ | I₃ | I₄ | I₅ | Interpretation |
|---|---|---|---|---|---|
| 0. | 1. | 3. | 1. | 1. | Pointer to the character string 'Carol' |
| 0. | 1. | 3. | 2. | 2. | Female |
| 0. | 1. | 3. | 3. | 32. | 32 years old |
| 2. | 1. | 4. | 1. | 1. | Pointer to the character string 'Tony' |
| 2. | 1. | 4. | 2. | 1. | male |
| 2. | 1. | 4 | 3. | 35. | 35 years old |
| 2. | 1. | 4. | 4. | 80. | 180cm |
| 0. | 1. | 23. | 1. | 1. | Pointer to the character string 'John' |
| 0. | 1. | 23. | 2. | 1. | Male |
| 0. | 1. | 23. | 3. | 66. | 66 years old |

Figure 2a

| multi-character expression | Interpretation |
|---|---|
| 1.1 | Domain for 'Organization A' |
| 1.1.10 | Person Attributes |
| 1.1.10.1 | Surname |
| 1.1.10.2 | Age |
| 1.1. 10.3 | Title |
| 1.1. 10.4 | Date of birth |

Figure 2b

| multi-character expression | Interpretation |
|---|---|
| 1.1 | Domain for 'Organization A' |
| 1.1.20 | A free text answer |
| 1.1.21 | A numeric answer |
| 1.1.22 | The answer group "Titles" |
| 1.1.22.1 | Answer option "Mr" |
| 1.1.22.2 | Answer option "Mrs" |
| 1.1.22.3 | Answer option "Miss" |
| 1.1.23 | Date / Time Answers |
| 1.1.23.1 | Date answer |
| 1.1.23.2 | Time Answer |
| 1.1.23.3 | Date and Time Answer |

Figure 2c

| Form Item Id | respondent prompt multi-character expression | respondent prompt Interpretation | Data input field multi-character expression | Data input field Interpretation |
|---|---|---|---|---|
| 1 | 1.1.10.1 | Surname | 1.1.20 | A free text answer |
| 2 | 1.1.10.2 | Age | 1.1.21 | A numeric answer |
| 3 | 1.1. 10.3 | Title | 1.1.22 | The answer group "Titles" |

Figure 2d

| Form Item Id | respondent prompt multi-character expression | respondent prompt Interpretation | Data input field multi-character expression | Data input field Interpretation |
|---|---|---|---|---|
| 1 | 1.1.10.1 | Surname | 1.1.20 | A free text answer |
| 2 | 1.1.10.2 | Age | 1.1.21 | A numeric answer |
| 3 | 1.1. 10.3 | Title | 1.1.22 | The answer group "Titles" |
| 4 | 1.1.10.4 | Date of birth | 1.1.23.1 | A date answer |

Figure 2e

| Form Item Id | respondent prompt multi-character expression | respondent prompt Interpretation | Data input field multi-character expression | Data input field Interpretation |
|---|---|---|---|---|
| 1 | 1.1.10.1 | Surname | 1.1.20 | A free text answer |
| 2 | 1.1.10.2 | Age | 1.1.20 | A free text answer |
| 3 | 1.1. 10.3 | Title | 1.1.22 | The answer group "Titles" |

Figure 2f

| Form Item Id | respondent prompt multi-character expression | respondent prompt Interpretation | Data input field multi-character expression | Data input field Interpretation |
|---|---|---|---|---|
| 1 | 1.1.10.1 | Surname | 1.1.20 | A free text answer |
| 2 | 1.1.10.2 | Age | 1.1.21 | A numeric answer |
| 3 | 1.1.10.3 | Title | 1.1.22 | The answer group "Titles" |
| 4 | 1.1.10.5 | Gender | 1.1.24 | The answer group "Genders" |

Figure 2g

| multi-character expression | Interpretation |
|---|---|
| 1.1.10.5 | Gender |

Figure 2h

| multi-character expression | Interpretation |
|---|---|
| 1.1.24 | Genders |
| 1.1.24.1 | Male |
| 1.1.24.2 | Female |

Figure 2i

| Form Item Id | respondent prompt multi-character expression | respondent prompt Interpretation | Data input field multi-character expression | Data input field Interpretation |
|---|---|---|---|---|
| 1 | 1.1.10.1 | Surname | 1.1.20 | A free text answer |
| 2 | 1.1.10.2 | Age | 1.1.21 | A numeric answer |
| 3 | 1.1. 10.3 | Title | 1.1.22 | The answer group "Titles" |
| 4 | 1.1.10.5 | Gender | 1.1.24 | The answer group "Genders" |
| 5 | 1.1.10.6 | Gender of partner | 1.1.24 | The answer group "Genders" |

Figure 2j

| multi-character expression | Interpretation |
|---|---|
| 1.1. 10.6 | Gender of partner |

Figure 2k

| Form Item Id | respondent prompt multi-character expression | respondent prompt Interpretation | Data input field multi-character expression | Data input field Interpretation |
|---|---|---|---|---|
| 1 | 1.1.10.1 | Surname | 1.1.20 | A free text answer |
| 2 | 1.1.10.2 | Age | 1.1.21 | A numeric answer |
| 3 | 1.1. 10.3 | Title | 1.1.22 | The answer group "Titles" |

Figure 2l

| Form Item Id | Rule | Value |
|---|---|---|
| 2 | Minimum numeric value | 0 |
| 2 | Maximum numeric value | 150 |

Figure 2m

| multi-character expression | Interpretation |
|---|---|
| 1.1 | Domain for 'Organization A' |
| 1.1.10 | Person Attributes |
| 1.1.10.1 | Surname |
| 1.1.10.2 | Age |
| 1.1. 10.3 | Title |
| 1.1. 10.4 | Date of birth |
| 2.1 | Domain for 'Organization B' |
| 2.1.10 | Person Attributes |
| 2.1.10.1 | Home phone number |
| 2.1.10.2 | Preferred communication method |

Figure 2n

| multi-character expression | Interpretation |
|---|---|
| 1.1 | Domain for 'Organization A' |
| 1.1.20 | A free text answer |
| 1.1.21 | A numeric answer |
| 1.1.22 | The answer group "Titles" |
| 1.1.22.1 | Answer option "Mr" |
| 1.1.22.2 | Answer option "Mrs" |
| 1.1.22.3 | Answer option "Miss" |
| 1.1.23 | Date / Time Answers |
| 1.1.23.1 | Date answer |
| 1.1.23.2 | Time Answer |
| 1.1.23.3 | Data and Time Answer |
| 2.1 | Domain for 'Organization B' |
| 2.1.20 | The answer group "Communication methods" |
| 2.1.20.1 | Electronic |
| 2.1.20.1.1 | Email |
| 2.1.20.1.2 | SMS |
| 2.1.22.2 | Non-electronic |
| 2.1.22.2.1 | Mail |
| 2.1.22.2.2 | Telephone |

Figure 2o

| Form Item Id | respondent prompt multi-character expression | respondent prompt Interpretation | Data input field multi-character expression | Data input field Interpretation |
|---|---|---|---|---|
| 10 | 1.1.10.3 | Title | 1.1.22 | The answer group "Titles" |
| 11 | 1.1.10.1 | Surname | 1.1.20 | A free text answer |
| 12 | 2.1.10.1 | Home phone number | 1.1.20 | A free text answer |
| 13 | 2.1.10.2 | Preferred communication method | 2.1.20 | The answer group "Communication methods" |

Figure 2p

| multi-character expression | Interpretation |
|---|---|
| 2.1 | Domain for 'Organization B' |
| 2.1.20 | The answer group "Communication methods" |
| 2.1.20.1 | Electronic |
| 2.1.20.1.1 | Email |
| 2.1.20.1.2 | SMS |
| 2.1.20.1.3 | Social Network |
| 2.1.20.1.3.1 | Facebook |
| 2.1.20.1.3.2 | Google+ |
| 2.1.20.1.3.3 | Other |
| 2.1.22.2 | Non-electronic |
| 2.1.22.2.1 | Mail |
| 2.1.22.2.2 | Telephone |

Figure 2q

| Form Item Id | data input field Option | Visible |
|---|---|---|
| 13 | 2.1.20.1 | True |
| 13 | 2.1.20.1.1 | True |
| 13 | 2.1.20.1.2 | True |
| 13 | 2.1.20.1.3 | True |
| 13 | 2.1.20.1.3.1 | True |
| 13 | 2.1.20.1.3.2 | True |
| 13 | 2.1.20.1.3.3 | True |
| 13 | 2.1.22.2 | False |
| 13 | 2.1.22.2.1 | False |
| 13 | 2.1.22.2.2 | False |

Figure 2r

| respondent prompt | data input field |
|---|---|
| Title | <A choice from the following answer group><br>▪Mr<br>▪Mrs<br>▪Miss |
| Surname | <A free text answer> |
| Home phone number | <A free text answer> |
| Preferred communication method | <A choice from the following answer group><br>• Electronic<br>    • Email<br>    • SMS<br>    • Social Network<br>        • Facebook<br>        • Google+<br>        • Other |

Figure 3a (form X)

| Form Item Id | respondent prompt multi-character expression | respondent prompt Interpretation | data input field multi-character expression | data input field Interpretation |
|---|---|---|---|---|
| 1 | 1.1. 10.3 | Title | 1.1.22 | The answer group "Titles" |
| 2 | 1.1.10.1 | Surname | 1.1.20 | A free text answer |
| 3 | 1.1.10.6 | Income | 1.1.21 | A numeric answer |
| 4 | 1.1.10.5 | Gender | 1.1.24 | The answer group "Genders" |

Figure 3b

| Form Item Id | Rule | Value |
|---|---|---|
| 3 | Minimum numeric value | 0 |

Figure 3c (form Y)

| Form Item Id | respondent prompt multi-character expression | respondent prompt Interpretation | data input field multi-character expression | data input field Interpretation |
|---|---|---|---|---|
| 5 | 1.1.10.3 | Title | 1.1.22 | The answer group "Titles" |
| 6 | 1.1.10.1 | Surname | 1.1.20 | A free text answer |
| 7 | 2.1.10.1 | Home phone number | 1.1.20 | A free text answer |
| 8 | 2.1.10.2 | Preferred communication method | 2.1.20 | The answer group "Communication methods" |

Figure 3d

| multi-character expression | Interpretation |
|---|---|
| 1.1 | Domain for 'Organization A' |
| 1.1.10 | Person Attributes |
| 1.1.10.1 | Surname |
| 1.1.10.3 | Title |
| 1.1.10.5 | Gender |
| 1.1.10.6 | Income |
| 2.1 | Domain for 'Organization B' |
| 2.1.10 | Person Attributes |
| 2.1.10.1 | Home phone number |
| 2.1.10.2 | Preferred communication method |

Figure 3e

| multi-character expression | Interpretation |
|---|---|
| 1.1 | Domain for 'Organization A' |
| 1.1.20 | A free text answer |
| 1.1.21 | A numeric answer |
| 1.1.22 | The answer group "Titles" |
| 1.1.22.1 | Answer option "Mr" |
| 1.1.22.2 | Answer option "Mrs" |
| 1.1.22.3 | Answer option "Miss" |
| 1.1.24 | The answer group "Genders" |
| 1.1.24.1 | Male |
| 1.1.24.2 | Female |
| 2.1 | Domain for 'Organization B' |
| 2.1.20 | The answer group "Communication methods" |
| 2.1.20.1 | Electronic |
| 2.1.20.1.1 | Email |
| 2.1.20.1.2 | SMS |
| 2.1.20.1.3 | Social Network |
| 2.1.20.1.3.1 | Facebook |
| 2.1.20.1.3.2 | Google+ |
| 2.1.20.1.3.3 | Other |
| 2.1.22.2 | Non-electronic |
| 2.1.22.2.1 | Mail |
| 2.1.22.2.2 | Telephone |

Figure 3f

| Question | data input field |
|---|---|
| Title | The answer option "Miss" |
| Surname | "Brown" |
| Income | 25000 |
| Gender | The answer option "Female" |

Figure 3g

| Organization Id | Subject Id | respondent prompt multi-character expression | data input field multi-character expression | data input field response | Date |
|---|---|---|---|---|---|
| A | 1 | 1.1.10.3 | 1.1.22 | 1.1.22.3 | 01/01/2013 00:00:00 |
| A | 1 | 1.1.10.1 | 1.1.20 | Brown | 01/01/2013 00:00:00 |
| A | 1 | 1.1.10.6 | 1.1.21 | 25000 | 01/01/2013 00:00:00 |
| A | 1 | 1.1.10.5 | 1.1.24 | 1.1.24.2 | 01/01/2013 00:00:00 |

Figure 3h

| Question | data input field |
|---|---|
| Title | The answer option "Mr" |
| Surname | "Smith" |
| Income | 30000 |
| Gender | The answer option "Male" |

Figure 3i

| Organization Id | Subject Id | respondent prompt multi-character expression | data input field multi-character expression | data input field response | Date |
|---|---|---|---|---|---|
| A | 1 | 1.1.10.3 | 1.1.22 | 1.1.22.3 | 01/01/2013 00:00:00 |
| A | 1 | 1.1.10.1 | 1.1.20 | Brown | 01/01/2013 00:00:00 |
| A | 1 | 1.1.10.6 | 1.1.21 | 25000 | 01/01/2013 00:00:00 |
| A | 1 | 1.1.10.5 | 1.1.24 | 1.1.24.2 | 01/01/2013 00:00:00 |
| A | 2 | 1.1.10.3 | 1.1.22 | 1.1.22.1 | 02/01/2013 00:00:00 |
| A | 2 | 1.1.10.1 | 1.1.20 | Smith | 02/01/2013 00:00:00 |
| A | 2 | 1.1.10.6 | 1.1.21 | 30000 | 02/01/2013 00:00:00 |
| A | 2 | 1.1.10.5 | 1.1.24 | 1.1.24.1 | 02/01/2013 00:00:00 |

Figure 3j

| Question | data input field |
|---|---|
| Title | The answer option "Mrs" |
| Surname | "White" |
| Income | 25000 |
| Gender | The answer option "Female" |

Figure 3k

| Organization Id | Subject Id | respondent prompt multi-character expression | data input field multi-character expression | data input field response | Date |
|---|---|---|---|---|---|
| A | 1 | 1.1.10.3 | 1.1.22 | 1.1.22.3 | 01/01/2013 00:00:00 |
| A | 1 | 1.1.10.1 | 1.1.20 | Brown | 01/01/2013 00:00:00 |
| A | 1 | 1.1.10.6 | 1.1.21 | 25000 | 01/01/2013 00:00:00 |
| A | 1 | 1.1. 10.5 | 1.1.24 | 1.1.24.2 | 01/01/2013 00:00:00 |
| A | 2 | 1.1.10.3 | 1.1.22 | 1.1.22.1 | 02/01/2013 00:00:00 |
| A | 2 | 1.1.10.1 | 1.1.20 | Smith | 02/01/2013 00:00:00 |
| A | 2 | 1.1.10.6 | 1.1.21 | 30000 | 02/01/2013 00:00:00 |
| A | 2 | 1.1. 10.5 | 1.1.24 | 1.1.24.1 | 02/01/2013 00:00:00 |
| A | 1 | 1.1.10.3 | 1.1.22 | 1.1.22.2 | 03/01/2013 00:00:00 |
| A | 1 | 1.1.10.1 | 1.1.20 | White | 03/01/2013 00:00:00 |
| A | 1 | 1.1.10.6 | 1.1.21 | 25000 | 03/01/2013 00:00:00 |
| A | 1 | 1.1. 10.5 | 1.1.24 | 1.1.24.2 | 03/01/2013 00:00:00 |

Figure 3l

| Question | data input field |
|---|---|
| Title | The answer option "Mrs" |
| Surname | "White" |
| Home phone number | |
| Preferred communication method | |

Figure 3m

| Question | data input field |
|---|---|
| Title | The answer option "Mrs" |
| Surname | "Whyte" |
| Home phone number | 0123 456 7890 |
| Preferred communication method | The answer option "Email" |

Figure 3n

| Organization Id | Subject Id | respondent prompt multi-character expression | data input field multi-character expression | data input field response | Date |
|---|---|---|---|---|---|
| A | 1 | 1.1.10.3 | 1.1.22 | 1.1.22.3 | 01/01/2013 00:00:00 |
| A | 1 | 1.1.10.1 | 1.1.20 | Brown | 01/01/2013 00:00:00 |
| A | 1 | 1.1.10.6 | 1.1.21 | 25000 | 01/01/2013 00:00:00 |
| A | 1 | 1.1. 10.5 | 1.1.24 | 1.1.24.2 | 01/01/2013 00:00:00 |
| A | 2 | 1.1.10.3 | 1.1.22 | 1.1.22.1 | 02/01/2013 00:00:00 |
| A | 2 | 1.1.10.1 | 1.1.20 | Smith | 02/01/2013 00:00:00 |
| A | 2 | 1.1.10.6 | 1.1.21 | 30000 | 02/01/2013 00:00:00 |
| A | 2 | 1.1. 10.5 | 1.1.24 | 1.1.24.1 | 02/01/2013 00:00:00 |
| A | 1 | 1.1.10.3 | 1.1.22 | 1.1.22.2 | 03/01/2013 00:00:00 |
| A | 1 | 1.1.10.1 | 1.1.20 | White | 03/01/2013 00:00:00 |
| A | 1 | 1.1.10.6 | 1.1.21 | 25000 | 03/01/2013 00:00:00 |
| A | 1 | 1.1. 10.5 | 1.1.24 | 1.1.24.2 | 03/01/2013 00:00:00 |
| A | 1 | 1.1.10.3 | 1.1.22 | 1.1.22.2 | 04/01/2013 00:00:00 |
| A | 1 | 1.1.10.1 | 1.1.20 | Whyte | 04/01/2013 00:00:00 |
| A | 1 | 2.1.10.1 | 1.1.20 | 0123 456 7890 | 04/01/2013 00:00:00 |
| A | 1 | 2.1.10.2 | 2.1.20 | 2.1.20.1.1 | 04/01/2013 00:00:00 |

Figure 3o

| Question | data input field |
|---|---|
| Title | The answer option "Mrs" |
| Surname | "Whyte" |
| Income | 25000 |
| Gender | The answer option "Female" |

Figure 3p

| Question | data input field |
|---|---|
| Title | The answer option "Mr" |
| Surname | "Smith" |
| Income | 32000 |
| Gender | The answer option "Male" |

Figure 3q

| Question | data input field |
|---|---|
| Title | The answer option "Mr" |
| Surname | "Smith" |
| Income | 36000 |
| Gender | The answer option "Male" |

Figure 3r

| Question | data input field |
|---|---|
| Title | The answer option "Mr" |
| Surname | "Smith" |
| Income | 35000 |
| Gender | The answer option "Male" |

Figure 3s

| Organization Id | Subject Id | respondent prompt multi-character expression | data input field multi-character expression | data input field response | Date |
|---|---|---|---|---|---|
| A | 2 | 1.1.10.6 | 1.1.21 | 30000 | 02/01/2013 00:00:00 |
| A | 2 | 1.1.10.6 | 1.1.21 | 32000 | 01/01/2014 00:00:00 |
| A | 2 | 1.1.10.6 | 1.1.21 | 36000 | 01/01/2015 00:00:00 |
| A | 2 | 1.1.10.6 | 1.1.21 | 35000 | 01/01/2016 00:00:00 |

Figure 3t

| Organization Id | Subject Id | Composite multi-character expression | Free text/numeric answer | Date |
|---|---|---|---|---|
| A | 1 | 1.1.10.3.1.1.22.3 |  | 01/01/2013 00:00:00 |
| A | 1 | 1.1.10.1.1.1.20 | Brown | 01/01/2013 00:00:00 |
| A | 1 | 1.1.10.6.1.1.21 | 25000 | 01/01/2013 00:00:00 |
| A | 1 | 1.1. 10.5.1.1.24.2 |  | 01/01/2013 00:00:00 |
| A | 2 | 1.1.10.3.1.1.22.1 |  | 02/01/2013 00:00:00 |
| A | 2 | 1.1.10.1.1.1.20 | Smith | 02/01/2013 00:00:00 |
| A | 2 | 1.1.10.6.1.1.21 | 30000 | 02/01/2013 00:00:00 |
| A | 2 | 1.1. 10.5.1.1.24.1 |  | 02/01/2013 00:00:00 |

COMPUTERISED DATA ENTRY FORM PROCESSING

TECHNICAL FIELD

The present invention relates to computerised forms used for data entry and data processing and associated database systems.

BACKGROUND

In the context of the present invention, forms are structured computer-generated documents or displays used for data entry to computer systems and possibly also for data verification during the data entry process. Forms allow a form provider to acquire structured and standardised data by asking one or more respondents to fill in instances of the form. The data acquired is generally stored in a database so that it can be extracted by appropriate queries and analysed.

Data entry forms are widely used by a number of different stakeholders, including: users who wish to collect data using forms; form creators who create forms for use by an organisation or by multiple organisations and who may wish to share forms with, or licence forms to, other users; forms automators who may include software vendors and IT departments responsible for the electronic automation of forms; and forms analysers who may include data analysts, information specialists and managers who wish to use, aggregate and work with the data captured using forms.

There can be substantial benefits in providing sets of standardised forms for use by many users. This reduces or avoids duplication of effort in creating forms for multiple organisations which have the same or similar data capture requirements, and also provides a consistency in data capture such that captured data can be shared between the organisations which are using common data entry forms.

However, many organisations or other users of data capture forms may have specific needs for data capture or preferences for data capture that they would prefer to implement over and above the generic data capture provided by a standardised form. While the use of a template form or generic standardised form is an ideal starting point, those organisations or users may prefer to add to, delete from, or amend a standardised form so as to allow for slightly different data capture requirements. Allowing such amendments to the standardised forms increases the flexibility for use of the forms by multiple organisations, but presents problems relating to maintaining data integrity and data compatibility between data collected using different versions of the forms. It may also create problems with version control of standard and modified forms and prevent or inhibit aggregation of data acquired using different versions of shared or otherwise generic standardised forms. It may also make it difficult to perform searches on data that has been captured using different form versions and present problems with saving captured data to different databases.

It is an object of the present invention to provide a solution to some or all of the above problems.

In GB 2293667B an innovative database system is described which configures a storage model based on a conceptual data model in accordance with a hierarchical structure. Every entity, every attribute and every entity occurrence is assigned a unique, multi-character expression which defines the relationship between each entity, attribute and entity occurrence with every other entity, attribute and entity occurrence in the database and may also uniquely define an attribute value to an occurrence of an entity. The expressions are stored in an expression set table linking each element of each expression with a natural language phrase relating the expression to a hierarchical level and a position in a data model. The "expressions" used are multi-character expressions conveniently divided into a number of "words", each of a number of bytes.

Each multi-character expression indicates a context (in the data model), a specification (e.g. a description/definition of the data being encoded) and a quality (e.g. actual data values or pointers thereto). Where any of these components are unknown or irrelevant, a wildcard character or "non-deterministic" character can be used. A feature of the expressions used to describe the data model is that similar data structures can be replicated throughout the main tree of multi-character expressions by changing only selected characters in the expression. As discussed in detail in the patent GB 2293667B, and in subsequent related patent GB 2398143B, the use of these multi-character expressions to store data in a database offers extremely fast searching and context switching capability when accessing data from the database.

In the present invention, the inventors have recognised that the methods of use of the multi-character expressions discussed in GB 2293697B and GB 2398143B, and the benefits thereof, can be adapted and used in techniques for improving the integrity of data input forms and datasets captured using those forms, and for helping provide version control of the forms. The multi-character expressions can be adapted for use not only for determining how captured data is stored and accessed in a database, but also how data entry forms for capturing data can be controlled and managed between different entities using the forms and variations thereof.

SUMMARY OF THE INVENTION

According to one aspect, there is provided an apparatus for processing multiple forms, wherein each form comprises at least one data input field and each data input field is configured to enable a respondent to enter input data into the form, the system configured to process a multi-character expression comprising:
one or more domain characters representing a domain; and
one or more field characters representing at least one data input field of the form,
wherein the one or more domain characters is indicative of variations in one or more of:
data input fields in the form;
discrete values of possible data inputs; and
validation logic associated with the at least one data input field.

A form may comprise more than one data input field. One form may be distinguished from another form by the data input fields in the form, the discrete values of possible data inputs and validation logic associated with the data input fields.

A data input field may be configured to receive a particular type of data, for example, the respondent's gender, age, height, name or other data. A data input field may be associated with a respondent prompt or question which denotes what data should be entered into the data input field. For example, a respondent prompt may comprise the word 'Gender', and the associated data input field may be configured to allow the respondent to enter a gender. Similarly, a respondent prompt may ask the user 'How old are you?', and the associated data input field may be configured to allow the respondent to enter his or her age.

The respondent entering the data into the form may be, for example, a user of the form system (e.g. a receptionist registering a patient using a registration form), the subject of the form (e.g. a purchaser using an on-line purchasing form to enter their own address), or a third party (e.g. a parent filing in the details of their child into a school registration form). A user of a form system may include those who wish to gather information using the form.

At least one data input field may be associated with discrete values of possible data inputs. For example, the data input field 'gender' may be associated with the discrete possible data input values 'male' and 'female'; or the data input field 'height in cm' may be associated with integer possible data input values of height in centimetres between '100' and '210'. The system may be configured to prevent entry of data which is not a possible data input value.

At least one data input field may be associated with validation logic associated with the at least one data input field. The validation may comprise allowed character checks and/or data type checks. For example, if the data input field was to obtain the name of a person, the validation may check that the response comprised alphabetic characters and not numeric characters. The validation may comprise consistency checks. For example, such validation would ensure that, if a respondent stated that their title was 'Ms', the 'gender' data input field response was 'female'. The validation may comprise presence checks to ensure that required data input fields are filled in. The validation may comprise a limit check and/or a range check. For example, a limit check may ensure that an 'age' data input field response does not exceed a predetermined value (e.g. 150 years old). The system may be configured to notify the respondent if the respondent's response does not satisfy the validation logic.

The domain may indicate ownership and/or authorship of the form and/or data entry field. The domain may indicate who can edit the form. For example, a form created by a national health service may be of a first domain, whereas a different form created by a particular hospital may be of a second domain. The domain may be associated with the form as a whole or with individual data entry fields.

The structure of each form may be defined by a dataset, the dataset comprising:
 a plurality of first multi-character expressions, each first multi-character expression defining a respondent prompt; and
 respective associated second multi-character expressions, each second multi-character expression defining a data input field.

Multiple second multi-character expressions may be associated with the same first multi-character expressions (for example, when the respondent prompt age is associated both with a free text data input field and a numeric answer data input field). Multiple first multi-character expressions may be associated with the same second multi-character expressions (for example, when the numeric answer data input field is associated with the respondent prompt age and the respondent prompt height). In some embodiments each first multi-character expression may be associated with a single second multi-character expression.

The dataset may comprise a plurality of composite multi-character expressions, each composite multi-character expression comprising a said first multi-character expression and the respective associated second multi-character expression.

The second multi-character expression may be configured to define the type of response available to the associated respondent prompt.

The dataset may comprise a form item identifier for each combination of a said first multi-character expression and respective associated section multi-character expression, and wherein validation logic is associated with a said form item identifier.

The system may be configured to store each response provided to each data input field in a database in association with the corresponding second multi-character expression and the respective associated first multi-character expression.

The system may be configured to store each response provided in association with a subject identifier identifying the subject of the form.

The multi-character expression may comprise one or more type characters representing a form type. The form type may indicate the purpose of the form, or denote a class of forms. Examples of form type may include registration forms, prescription forms, assessment forms, and/or activity forms.

A particular form may be associated with a particular domain and with a particular form type. For example, a national health service registration form may be distinct from a Nottingham City Hospital registration form (i.e. the form type is the same but the domain is different). Likewise, a national health service registration form may be distinct from a national health service prescription form (i.e. as the domain is the same but the form type is different). Each form may be considered to be a particular combination of data input fields, data validation logic and/or discrete values of possible data inputs.

A form instance may be considered to be a particular instance of a form, such as the form given to a particular individual. For example, the patient John Smith's national health service registration form is a particular instance of the national health service registration form. A form instance may be associated with the responses relating to a particular subject.

The multi-character expression may comprise a response character, the response character representing a response of a respondent to the data input field represented by the one or more field characters of the multi-character expression. The multi-character expressions may comprise one or more type characters representing a form type.

The multi-character expression may comprise an instance character, the instance character representing an instance of a form of a particular form type and form domain.

The field characters may be configured to be the same regardless of at least one of the form type and domain. It will be appreciated that characters which are same may allow all of the data associated with that character to be extracted using a single query which specifies only that character.

The processing of a multi-character expression may comprise:
 generating a said multi-character expression in response to receiving data input associated with a particular data input field from a respondent.

The processing of a multi-character expression may comprise:
 querying a database, the database comprising one or more multi-character expressions.

The querying may comprise:
 comparing each multi-character expression stored in the database with a multi-character query expression, the multi-character query expression comprising characters that are deterministic to the query and characters that are not deterministic to the query.

Variations of fields in the form may comprise one or more of:
  removal of one or more data input fields; and
  addition of one or more data input fields.

Each of the characters may have a predetermined position and format within the data expression which is independent of the domain.

Each multi-character expression may be associated with an interpretation.

In a further aspect, there is disclosed a method for processing multiple forms, wherein each form comprises at least one data input field and each data input field is configured to enable a respondent to enter input data into the form, the method comprising:
  processing a multi-character expression comprising:
  one or more domain characters representing a domain; and one or more field characters representing at least one data input field of the form, wherein the one or more domain characters is indicative of variations in one or more of:
  data input fields in the form;
  discrete values of possible data inputs; and
  validation logic associated with the at least one data input field.

In a further aspect, there is disclosed a computer program for processing multiple forms, wherein each form comprises at least one data input field and each data input field is configured to enable a respondent to enter input data into the form, the method comprising:
  processing a multi-character expression comprising:
  one or more domain characters representing a domain; and one or more field characters representing at least one data input field of the form, wherein the one or more domain characters is indicative of variations in one or more of:
  data input fields in the form;
  discrete values of possible data inputs; and
  validation logic associated with the at least one data input field.

The computer program may be stored on a storage media (e.g. on a CD, a DVD, a memory stick or other non-transitory medium). The computer program may be configured to run on a device or apparatus as an application (e.g. via an operating system).

BRIEF DESCRIPTION OF THE FIGURES

The present invention will now be described by way of example, and with reference to the accompanying drawings in which:

FIG. 1a is a table indicating which data entry fields are present in forms of a particular type and domain;

FIG. 1b is a table of multi-character expressions and their associated interpretations;

FIG. 1c is a table of multi-character expressions representing possible responses to corresponding data input fields;

FIG. 1d is an extract from a database which stores data inputted using a plurality of forms;

FIGS. 2a-2r are multi character expressions and associated interpretations for forms which can be edited within a forms system; and FIGS. 3a-3t are multi character expressions and associated interpretations corresponding to data being generated and stored using a forms system.

DESCRIPTION OF EXAMPLE ASPECTS/EMBODIMENTS

The present invention relates to processing data relating to a number of forms. Each form comprises one or more data input fields which are dependent on the domain of the form.

The one or more input fields may also be dependent on the type of the form. For example, in a national health service, a variety of forms may be used to gather different types of data. That is, the health service may have a registration form for gathering information about each patient when they join a health service, an assessment form for inputting information about a patient's medical condition, and a prescription form for inputting what medication has been prescribed to a particular patient. It will be appreciated that other organisations such as companies, governments, or service providers may have other types of forms (e.g. crime report form for the police, tax form for the government).

In large organisations, there may be a number of different forms of the same type. Forms may be required to have local variations to accommodate specific local data requirements. That is, different forms may be configured to be used in different places or times in analogous situations. For example, a particular hospital in a national health service may wish to adapt the registration form in order to allow variations in the data recorded by the registration form. Similarly, a national health service may wish to update its form at regular intervals.

Encoding domain information in the multi-character expression associated with each response, may allow domain information to be immediately available when the database is queried for information. For example, if a user queries a database to obtain statistics on the gender of patients registered at different hospitals, the multi-character expressions returned would not only include information on the gender of the patient, but also information relating to domain and possibly to the form type. This would, for example, allow the user to ascertain which hospitals were recording gender data on their registration forms.

FIG. 1a is a table listing data input fields in a variety of different forms in a health system. In this example, the national health service is a global domain and places certain requirements on the data input fields present in each type of form. That is, in this case, the global domain places restrictions on how the local domain can vary the forms administered by the local domains. In this case, the national health service global domain form provides forms which meet the minimum national health service requirements. For example, for a registration form type, the national health service global domain provides a registration form having the data input fields of 'name', 'gender', 'age' and 'address'.

In this case, each hospital is a local domain of the national health service and, as such, must use registration forms having at least the required data input fields present in the national health service global domain form. To achieve this, each hospital may simply use the registration form provided by the national health service. As shown in FIG. 1a, 'Hospital 1' and 'Hospital 3' have not provided an independent form and so will use the global domain national health service form. However, each hospital is also free to add additional data input fields to the global domain form thereby creating a local domain form, the additional data input fields providing additional information (e.g. for internal use). It will be appreciated that in other example organisations, a local domain may also be allowed to remove data input fields from a form.

As shown in FIG. 1a, 'Hospital 2' has elected to adjust the global domain form by adding an additional data input field. In this case, the local domain 'Hospital 2' form of the type 'registration' also includes a 'height' data input field.

To process the data from a form, each data input field is associated with a multi-character expression comprising: one or more domain characters representing a domain of a form; one or more type characters representing a form type; and one or more field characters representing at least one data input field of the form.

FIG. 1b is a table indicating the corresponding explanation of a number of multi-character expressions. Characters which do not influence the interpretation of the multi-character expressions and can take any available value are denoted with the hash symbol, #. Characters which influence the interpretation of the multi-character expressions and have a particular value are denoted with the letter, x.

In this case, the first character, $I_1$, in the multi-character expression represents the domain of the form. For example, if $I_1=0$, the multi-character expression is associated with the global domain. The second character, $I_2$, in the multi-character expression represents the form type. For example, if $I_2=1$, the multi-character expression is associated with a registration form. The first and second characters may be considered is to denote a particular form, distinguished from other forms by having a particular selection of data input fields, data validation logic and/or discrete possible data input values. That is, if $I_1=0$ and $I_2=1$, the data is denoted as being associated with a registration form of the global national health service domain.

The third character, $I_3$, in the multi-character expression represents the form instance. That is, in this case, each subject would be given a different instance of the same form, the instance being denoted by the instance character, $I_3$. This might be a unique serial number or code.

In this case, the fourth character, $I_4$, in the multi-character expression identifies a particular data input field within a particular form. For example if $I_4=2$ in a data entry of a registration form, the data is associated with the gender data input field.

It will be appreciated that each form is made up of one or more multi-character expressions corresponding to the data entry fields of the form. For example the global domain national health service registration form is made up of the data fields represented by the multi-character expressions:

| | |
|---|---|
| 0.1.#.1. | data input field name |
| 0.1.#.2. | data input field gender |
| 0.1.#.3. | data input field age |

In this example, characters of the multi-character expression which may take any available value are represented by the '#' character. Similarly, the local domain 'Hospital 2' registration form is made up of the data fields represented by the multi-character expressions:

| | |
|---|---|
| 2.1.#.1. | data input field name |
| 2.1.#.2. | data input field gender |
| 2.1.#.3. | data input field age |
| 2.1.#.4. | data input field height |

That is, in this example, the one or more domain characters are indicative of variations between different forms of the same form type in the data input fields in the form. In this example, when one data input field of the form is changed (e.g. when the height data input field is added), the one or more domain characters of the multi-character expressions for all of the data input fields are also changed to be associated with the domain which varied the form (e.g. the name data input field is changed from 0.1.#.1. to 2.1.#.1.), such that all of the one or more domain characters are the same for a given form. It will be appreciated that other embodiments may be configured to change the one or more domain characters in only the multi-character expressions which changed. That is, the unchanged data input fields may have the same one or more domain characters as the original form.

When a new patient is to be registered at a hospital, the respondent will be provided with an appropriate instance of a registration form to complete. For new patients of hospital 1 or hospital 3, the respondent will be provided with an instance of the global domain national health service registration form, and for new patients coming to hospital 2, the respondent will be provided with an instance of the local domain 'Hospital 2' registration form. In this example, each instance of the registration form is assigned with a globally unique form instance number. This form instance number is encoded in the multi-character expression as the third character, $I_3$.

Some data entry fields are associated with a number of possible responses. For example, the data entry field 'gender' may be associated with the responses 'male' and 'female'. Where there are a reasonably small number of discrete options, each option may be represented by a separate multi-character expression. This is shown in FIG. 1c. In this scenario, the possible data input values to the form data input field are encoded as specific multi-character expressions.

When an instance of a form is completed for a patient, the form would be assigned a unique identifier or serial number. For example, if Carol is registered as a patient in 'hospital 1' (using the global domain national health service registration forms), a global domain national health service registration form is completed. To distinguish the instance of the form completed for the respondent Carol, the form would have a particular form instance number. In this case, the form instance number is '3'. That is, #.#.3. corresponds to any instance of the form specific to Carol. In this example, therefore, the data input fields of the particular form instance would be:

| | |
|---|---|
| 0.1.3.1. | data input field name in Carol's form |
| 0.1.3.2. | data input field gender in Carol's form |
| 0.1.3.3. | data input field age in Carol's form |

Carol would then fill in the form. She is a female, aged 32. This would be encoded by directly using multi-character codes or by linking to a pointer to the data. In this case the multi-character codes would be:

| | |
|---|---|
| 0.1.3.1.1. | Pointer to the character string 'Carol' |
| 0.1.3.2.2. | Female |
| 0.1.3.3.32. | 32 |

However, if a patient wished to register with 'hospital 2', which uses the adapted registration form the data would be distinguished from the global domain form by the domain number. For example, ($I_1$=2 is associated with the forms administered with local domain 'Hospital 2'). In this example, therefore, the data input fields of the form instance 4 would be:

| | |
|---|---|
| 2.1.4.1. | data input field name |
| 2.1.4.2. | data input field gender |
| 2.1.4.3. | data input field age |
| 2.1.4.4. | data input field height |

If Tony, for example, were to be registered using this form the respondent would enter the same details as would be required for the global domain registration form but in addition would enter a height response (1.1.#.4.80.=180 cm). The completed form, which in this case has an instance character $I_3$=4, would comprise the following responses:

| | |
|---|---|
| 2.1.4.1.1. | Pointer to the character string 'Tony' |
| 2.1.4.2.1. | male |
| 2.1.4.3.35. | 35 |
| 2.1.4.4.80. | 180 cm |

In this case, a person querying the database would know that each registration form administered by local domain 'hospital 2' has four data input fields, whereas each registration form administered by Global domain has only three.

In this way, the value of the domain characters is indicative of variations in one or more of fields in the form, discrete values of data inputs allowed, and validation logic associated with the at least one data input field.

As each data response stored in the database comprises information about the domain and the type of form used to enter the data, the data responses provided using the local domains and the global domains may be stored in a single database. Likewise data responses provided using different types of form may be stored in a single database. In addition, encoding the particular form in which the data is entered into each multi-character expression may improve data integrity.

FIG. 1$d$ is an extract of a database table comprising data from a number of instances of registration forms. The data in the database include data recorded using the global domain national health service ($I_1$=0) registration ($I_2$=1) form and data recorded using the local domain 'Hospital 2' ($I_1$=1) registration ($I_2$=1) form.

To query the database, a user might wish to obtain information on the gender balance of patients registered with the national health service. In the above example, each data input field multi-character expression can be identified using the form-type character ($I_2$) and the input field character ($I_4$). For example, if $I_2$=1 and $I_4$=2, the multi-character expression relates to the gender data input field regardless of the domain of the form used to input the data. That is, in this case, the field characters are configured to be the same regardless of the domain.

Therefore the user could query the database to extract gender information using the multi-character query expression #.1.#.2.#. That is, the multi-character query expression comprises the characters $I_2$, which equals 1, and $I_4$, which equals 2, that are deterministic to the query; and characters, $I_1$, $I_3$, and $I_5$, which are not deterministic to the query (i.e. they can take any value). The system then compares each of the rows of the database with the deterministic characters of the multi-character query expression in order to extract the relevant records.

It will be appreciated that it may be preferable to configure the field characters associated with a particular data input field to be the same regardless of the domain and/or form type (e.g. by enforcing a global standard, or allowing a form creator to select from predetermined field characters). This may reduce and/or simplify the queries required to extract data and thereby improve efficiency as a single query may be used to extract the data associated with the corresponding data input field. Furthermore, if the domain and/or type character do not need to be specified for a query the system may need to process fewer character comparisons.

The present invention can be readily realized both in software, and in hardware.

It will be understood that the database querying essentially requires byte wide comparison of the expressions $I_1$ to $I_n$. An extremely fast co-processor ASIC could thus be manufactured which includes up to n eight-bit comparators in parallel. In practice, querying would never require all fifteen bytes to be compared, as most queries involve the setting of a large number of the bytes to a non-deterministic state, thus in practice requiring fewer parallel circuits and enabling simplification of the design of a dedicated co-processor.

FIG. 2$a$-2$p$ shows another embodiment of a form system. Unlike the previous embodiment, in this embodiment, in addition to the multi-character expression for the data input field, a separate multi-character expression is provided for the respondent prompt.

FIG. 2$a$ gives a hierarchy including the multi-character expressions corresponding to a selection of respondent prompts. It will be appreciated that the respondent prompts may be in the form of questions which can be answered by entering data in to corresponding data input fields. Unlike the previous embodiment, in which the domain was associated with the form as a whole so that each domain character of a particular form was the same, in this embodiment, the domain is associated with each data input field and respondent prompt independently. This means that different data input fields and respondent prompts of the same form may have different domains, and therefore different domain characters.

In this embodiment, the prompt multi-character expression comprises a prompt category character indicating the category of the respondent prompts. In the selection shown in FIG. 2$a$, the respondent prompts are in the 'Person Attributes' category, which is indicated by the third character of the prompt multi-character expression being 10. The last four rows in FIG. 2$a$ are respondent prompt multi-character expressions and the corresponding interpretations: 'surname'; 'age'; 'title'; and 'date of birth'.

Each of the respondent prompts and data input fields shown in FIG. 2$a$ have been generated within the domain of 'Organisation A'. That is, each of the multi-character expressions has the same first two characters (1.1) which denote that the domain of the multi-character expression is 'Organisation A'.

FIG. 2$b$ gives a hierarchy including the multi-character expressions corresponding to a selection of data input fields, and possible response data input values. For example, for the data input field 'Titles', denoted by the multi-character expression 1.1.22, there are three possible responses: Mr, corresponding to the multi-character expression 1.1.22.1; Mrs, corresponding to the multi-character expression 1.1.22.2; and Miss, corresponding to the multi-character expression 1.1.22.3. It will be appreciated that the multi-character expressions generated by responding to a data input field corresponding to a free text data input field may correspond to a pointer pointing to the entered text response.

To generate a form, a user can select combinations of respondent prompts and data input fields. It will be appreciated that generated forms may be stored for later use in a forms repository. The respondent prompts dictate what the respondent will see when they are filling in the form. The corresponding data input field multi-character expressions dictate the available data input values. For example, if the data input field expression is a 1.1.21, the system would recognise that the response should be a number.

FIG. 2c shows an example embodiment of a form generated within the domain of 'Organisation A', in which the user has selected a number of data input fields and corresponding data input value expressions. In this case, the user has selected the data input fields of 'Surname', 'Age' and 'Title', with corresponding data input value multi-character expressions limiting the data input values to free text data input values, numeric data input values and data input values from the data input value group "titles" respectively. This form is also configured to give each data input field an identifier to identify each respondent prompt and data input field combination.

The user within the domain of 'Organisation A' can alter a form in several ways. For example, as shown in FIG. 2d, the user can add additional respondent prompt/data input field combinations. In the situation depicted in FIG. 2d, the user has added a respondent prompt and a data input field to allow the respondent to enter a date of birth. The data input field multi-character expression limits the response to date data input values.

The user can also alter the data input field associated with a respondent prompt. In the situation depicted in FIG. 2e, the user has replaced the multi-character expression associated with the age respondent prompt such that it is no longer limited to numeric data input values but can be any free text. In this way, the respondent could enter the age as words (e.g. forty four).

The user could also generate completely new respondent prompt and data input field multi-character expressions. In the situation shown in FIG. 2f the user has generated a new respondent prompt and data input field for 'gender'. The user has also generated a new response hierarchy for the possible responses. This is shown in FIGS. 2g and 2h, where the multi-character expression corresponding to the newly created gender data input field can be any of two discrete values: 1.1.24.1—male; or 1.1.24.1.—female.

An advantage of having separate multi-character expressions for each respondent prompt and data input field is that the user may re-use respondent prompts and/or the data input fields in different combinations. For example, as shown in FIG. 2h, the user has created a new respondent prompt question "Gender of partner" but has reused the data input field "Genders". This allows the user to create a new prompt/field combination by only creating one new respondent prompt (which is shown in FIG. 2j)

The user may also attach validation rules to the form. For example, a validation rule may be associated with the age question of the form shown in FIG. 2k. In this case, the validation rule is associated with the identification number associated with the prompt/field combination as shown in FIG. 2l. That is, the validation logic applied is that the numeric data input value must be greater than 0 and less than 150.

In addition to allowing the users of the domain to alter and update the forms and the constituent respondent prompts and data input fields, the form can be shared across multiple domains.

In this case, if a second organization joins the forms system they are assigned one or more domain character from which all items they create in the system can be built. In this case, the multi-character expressions created by the second 'Organisation B' will start by the two characters 2.1. This is shown in FIGS. 2m and 2n.

In this example, a user of 'Organisation B' has added a number of new respondent prompts. In particular, they have added the prompts 'person attributes', 'home phone number' and 'preferred communication method'. Multi-character expressions corresponding to these new respondent prompts are shown in FIG. 2n. In this embodiment, the third character remains the same for respondent prompts in the same category. That is, because both the respondent prompt 'Home phone number' and 'age' are in the 'person Attributes' category, the third character of each multi-character expression is 10, even though the two respondent prompt are associated with different domains. This means that when the database is queried, the query can be limited to the third character being 10 in order to retrieve results relating to the 'Person Attributes' category. This may make the queries more efficient.

It will be appreciated that other embodiments may not have the same hierarchies. For example, in other embodiments the character for 'Person Attributes' for the second organisation may be 7 (or may occupy a different position within the multi-character expression). In such cases, because the domain is encoded in each multi-character expression the multi-character expressions of both organisations can nevertheless be stored in the same database. To query such a database for 'Person Attributes' the query would be limited to: the first characters being 1.1 and the third character being 10 ('Person Attributes' of the Organisation A); or the first characters being 2.1 and the third character being 7 ('Person Attributes' of the Organisation B).

The user of 'Organisation B' has also added a number of new data entry fields. In particular, they have added a new hierarchy to allow a number of discrete responses to the 'preferred communications method' data input field. Multi-character expressions corresponding to this new data input field "Communication methods" and the available discrete responses are shown in FIG. 2m. Because both the data entry field and respondent prompt multi-character expressions comprise domain characters, the domain characters are indicative of variations in one or more of: data input fields in the form; discrete values of possible data inputs. That is, when a user in a different domain alters a data input field, the altered data input field is associated with a multi-character expression with a different domain character.

Either organization now may be able to use the multi-character expressions created by the other organization as well as the multi-character expressions they have created. For instance, "Organization B" may create the form shown in FIG. 2o. In this example, the form is a combination of multi-character expressions from "Organization A", denoted by the initial characters 1.1; and from "Organization B", denoted by the initial characters 2.1. By separating the respondent prompts from the data input fields, prompt/field combinations can be formed from respondent prompts and data input fields from different domains. For example, in the form shown in FIG. 2o, form item 12 is made up of a data input prompt created by "Organization A" and a data input field created by "Organization B".

In some embodiments, the domain may grant another domain permission to amend part of their hierarchy. For example, in the table shown in FIG. 2p, "Organization A" could add data input value options, such as 'Social Network' and more specifically 'Facebook', 'Google+' and 'Other', to the "Organization B" data input value field "Communication methods".

An organization may also elect to reuse predefined respondent prompts and data input fields but configure them to meet their own organizational requirements. For instance, an organization may choose to use a data input field but wish to omit some of the possible data input values.

So, in the case of the form shown in FIG. 2o mentioned earlier, the organization could opt to alter the "Communications methods" data input field by applying a filter to it. The multi-character expressions corresponding to the Communications methods data input field is shown in FIG. 2p and includes electronic communications (multi-character expression: 2.1.20.1) such as email (2.1.20.1.1) and SMS (2.1.20.1.2); and non-electronic communications such as mail (2.1.20.2.1). In the example below the organization wants to use the same form but has opted to omit the "Non-electronic" communication methods from the form item answer group "Communication methods".

The available responses are limited, in this case, by attaching validation logic to the form. In this case, each of the possible responses is assigned a truth value indicating whether or not they are an acceptable response. This is shown in FIG. 2q. That is, only the possible data input values which correspond to a true truth value are permitted. In this case, this is implemented by only displaying the permitted data input values for selection (e.g. in a drop down menu). In other embodiments, the response may be validated when the respondent completes filling in the form or after the respondent has responded to a particular respondent prompt.

The structure of the form is shown in FIG. 2r. For example, from the structure it can be seen that 'email' is a subset of 'electronic'; and that 'Facebook' is a subset of 'Social Network' which in turn is a subset of 'Electronic'. In this case, this hierarchy is also reflected in the multi-character expressions associated with the possible data input values. For example, the multi-character expression associated with 'Facebook' (2.1.20.1.3.1) comprises the multi-character expression associated with 'Social Network' (2.1.20.1.3) which in turn comprises the multi-character expression associated with 'Electronic' (2.1.20.1). This ability to exclude certain answer options encourages organizations to reuse standard answer groups while still allowing them the flexibility to tailor the answer group to their own requirements.

It will be appreciated that if a particular domain changes the validation logic of a question in the form, this may be reflected in the multi-character expressions by changing the Domain character of the form. This may allow, for example, meaningful statistics to be drawn when comparing data from organisations which allow any communication methods to be recorded and organisations which only allow electronic communication methods to be recorded as the domain character will indicate which data input values were available when the form was completed.

By including one or more domain characters within the multi-character expressions for each respondent prompt and for each data input field, data generated from forms generated/owned by different domains can be stored in, and accessed from, the same database. That is, assuming each domain maintains a separate data structure within its own domain, this data structure will not conflict with data from a different domain as each data item would be distinguished by at least the one or more domain characters. This allows different domains to amend forms (e.g. by varying one or more of: data input fields in the form; discrete values of possible data inputs; and validation logic associated with the at least one data input field) without affecting the structure of the database. For example, a second domain could add additional respondent prompts to a form but the multi-character expressions of the unchanged portions of the form may remain the same. Furthermore, when querying the database, a user would be able to determine, from the multi-character expression results, which domain generated, or had responsibility for, each respondent prompt and for each data input field.

Once a form has been built by an organization, it can then be used to capture data. It will be appreciated that the organization capturing the data does not need to be the organization that created the form.

The structure of the multi-character expressions is agnostic to how the form is rendered (i.e. the multi-character expressions may not limit how the form can be presented to the user) and thus a number of different ways may be utilized. For example, the forms could, for example, be rendered via a standard browser based computer interface, or using a command line interface.

FIGS. 3a-3s show how data can be added to a database using the forms system, and how the stored data can be used.

In the following example two forms have been created: form X created by Organisation A which is shown in FIG. 3a and which has associated validation logic as shown in FIG. 3b; and form Y created by Organisation B which is shown in FIG. 3c.

The validation logic shown in FIG. 3b, in this case, is checked when the data input field is completed. If the validation logic is not satisfied, the form may display an error message or request that the user enters a different value.

It will be appreciated that certain data input fields may have inherent 'global' validation rules associated with them by defining the response type. For example, if the answer type is numeric then the user would not be allowed to enter a non-numeric response, such as a textual response. Therefore, the system would validate that the response entered is of the correct type.

Other embodiments may be configured to use 'global' validation rules for combinations of respondent prompts and data input fields which are applied regardless of the particular form. For example, the combination of the respondent prompt 'age' and the 'numeric' data input field may be associated with the 'global' validation logic that the age is a positive number. Nevertheless, it will be appreciated that linking the validation logic with a particular form may enable validation logic which is more specific to the context of the form than possible global validation logic. For example, form specific validation logic may be provided for a hospital form to require a date of birth later than 1 Jan. 1850, and different form specific validation logic may be provided for a primary school form to require a date of birth of later than 1 Jan. 2000.

In this case, form X (FIG. 3a) and form Y (FIG. 3c) have certain respondent prompts in common (e.g. Surname) but also have other respondent prompts that are unique to that form (e.g. "Gender" in Form X).

In this case, the two forms are supported by the following multi-character expressions: the multi-character expressions corresponding to the respondent prompts are shown in FIG. 3*d*; and the multi-character expressions corresponding to the possible data input field values are shown in FIG. 3*e*.

In this case, the supporting hierarchy of data input fields and possible data input field values is made up of multi-character expressions from two organizations. For example, the respondent prompt 'surname' was added by organisation A so the first characters in the corresponding multi-character expression are 1.1. Likewise, the respondent prompt 'Home phone number' was added by organisation B so the first characters in the corresponding multi-character expression are 2.1. The system allows for any number of organizational multi-character expression hierarchies to be used to support a set of forms.

In this example, using form X (shown in FIG. 3*a*) a respondent for organisation A provides the responses shown in FIG. 3*f* for Subject 1. It will be appreciated that the respondent may or may not be aware from the user interface how the data input values provided are stored in the database. In this case, if an Income less than zero is entered the user will be notified that this is not permitted (see FIG. 3*b* for the validation logic associated with form X as shown in FIG. 3*a*) and the form system will not accepted the submission of the form until the error has been corrected.

When the form has been completed the data is stored in a database. The stored data corresponding to the completed form is shown in FIG. 3*g*. The stored data includes information on the Organisation, information identifying the user, the multi-character expression associated with the data input field; the multi-character expression associated with the data input field; the response to the data input field and a time stamp.

Storing the multi-character expressions in separate fields may help improve database performance. For instance, to determine how many people responded to a particular respondent prompt (e.g. 'salary' or 'are you depressed?') it may be easier to count the number of users with that respondent prompt multi-character expression when the respondent prompt multi-character expression is separate from the data input field multi-character expression than having to split open, or parse, composite multi-character expressions to examine if a part of it matches the multi-character expression for the respondent prompt. In addition, on database design level, as meta-data may be stored in other tables about respondent prompts (e.g. the respondent prompt text and any help text associated with respondent prompt), data input fields and/or possible data input values, it may be much more efficient to directly query the respondent prompt multi-character expression rather than ask the database to calculate the matches by splitting up a composite multi-character expression.

In this example form X (shown in FIG. 3*a*) is then completed in the manner shown in FIG. 3*h* for Subject 2. This data would be added to the database as shown in FIG. 3*i*.

The data could be updated for a given user. For instance, Subject 1's circumstances could change as shown in FIG. 3*j*. Therefore a further submission would be provided with the updated details as shown in FIG. 3*j*.

In this case, the data is stored in association with a time stamp relating to when the data were collected. Therefore the updated is appended to the data store as shown in FIG. 3*k*. That is, in this embodiment, rather than replace the previous entry for the subject's title and surname further entries are added to the database. This allows a historical profile of the user to be built up.

Because data generated by multiple forms are stored for a particular user this data could be used to pre-populate forms which are being completed for the same user. For example, if form Y was being used to record data for subject 1 who has already filled in data using Form X, any matching data that has already been entered will be pre-populated in the form when form Y is opened for subject 1. This is shown in FIG. 3*l*, where the forms system has recognised that data corresponding to the title and surname has already been stored on the database. It will be appreciated that in other embodiments, the multi-character expression may comprise one or more form characters relating to the form used to collect the data (e.g. a character indicating whether form X or form Y was used to record the data).

The respondent (who may or may not be the subject) can now update and add to the data as they wish. As shown in FIG. 3*m* new information has been supplied for two of the respondent prompts ("Home phone number" and "Preferred communication method") and one response has been updated ("Surname" has been changed from "White" to "Whyte"). The data would be appended to the data store as shown in FIG. 3*n*. It will be appreciated that other embodiments may or may not store additional versions of data which has not changed.

Because this embodiment is configured to pre-populate the forms using information stored on the database, if an instance of form X were re-opened for Subject 1, the form would display the updated information as shown in FIG. 3*o*. For example, in this case, the surname in form X would be updated with the updated information 'Whyte' provided using form Y (as shown in FIG. 3*m*). That is, in this case, the most up to date information for Subject 1 is displayed irrespective of the form that captured that information.

As noted above, the method of data capture described allows for all historical data to be held. For instance, if the form was resubmitted with updated information on Subject 2's income, then this would allow for the user's historical income levels to be reported on. For example, FIGS. 3*p*-3*r* show successive submissions using Form X on Jan. 1, 2014, Jan. 1, 2015, and Jan. 1, 2016 respectively.

FIG. 3*s* shows the result of a query of the database wherein the query was limited to Subject 2 and the data input field multi-character expression corresponding to salary. The results will filter out each of the salary data input values and allow the subjects historical salary to be determined.

The above described embodiments illustrate that, by encoding domain information indicating variations in one more of data input fields in the form; discrete values of possible data inputs; and validation logic associated with at least one data input field, the multi-character expressions can be adapted and used in techniques for improving the integrity of data input forms and datasets captured using those forms, and for helping provide version control of the forms. For example, even though different domains may use the same database for storing the data, there is reduced need to impose restrictions on how the data is stored because the data stored by each domain can be distinguished from data stored by other domains using the domain character.

In summary, embodiments may allow for questions and answers for forms (in the form of respondent prompts, data input fields and possible data input values) to be standardized and shared between organizations. The standardized question (respondent prompt) and answer (data input field with corresponding data input value) structures may allow for data to be captured across disparate sources in a manner that is agnostic of, or indifferent to, the containing form structure that is holding the question. That is, the system may allow a single, consistent, central view of the data which, in turn, can easily be reported on. This is in contrast to traditional systems where data and the meta information to describe data it is generally distributed across different data sources and difficult to aggregate and report on.

It will be appreciated that the above described examples represent only some of the possible uses of such form systems. For example, in some embodiments, the respondent prompt and the associated data input field multi-character expression may be combined to form a composite multi-character expression. For example, the data shown in the database of FIG. 3*i* could be stored in a database in a different format as shown in FIG. 3*t*. In this case, each composite multi-character expression is formed by appending the data input field multi-character expression and the one or more response characters to the end of the corresponding respondent prompt multi-character expression. There remains a separate column for those responses which are not stored as character codes, such as free text responses. Storing the data using composite multi-character expressions may make it easier to transmit data between different devices.

The invention claimed is:

1. An apparatus for processing multiple forms, wherein each form comprises at least one data input field and each data input field is configured to enable a respondent to enter input data into the form, the apparatus comprising a processor configured to:
    process a multi-character expression associated with the form, the multi-character expression comprising:
        a form type;
        one or more domain characters, wherein the one or more domain characters are indicative of variations between different forms of the same form type; and
        one or more field characters representing at least one data input field of the form, wherein the one or more domain characters represents a domain of the form or a domain of at least one of the one or more field characters, and is indicative of variations in one or more of:
        data input fields in the form;
        discrete values of possible data inputs; and
        validation logic associated with the at least one data input field;
    wherein processing the multi-character expression comprises:
        querying a database, the database comprising one or more multi-character expressions, wherein the querying comprises:
            comparing multi-character expressions stored in the database with a multi-character query expression, the multi-character query expression comprising characters that are deterministic to the query and characters that are not deterministic to the query; and
            returning a record in the database that matches the deterministic characters in the multi-character query expression,
    wherein the structure of each form is defined by a dataset, the dataset comprising:
        a plurality of first multi-character expressions, each first multi-character expression defining a respondent prompt; and
        respective associated second multi-character expressions, each second multi-character expression defining a data input field; and
    wherein the dataset comprises a form item identifier for each combination of a said first multi-character expression and respective associated second multi-character expression, and wherein validation logic is associated with said form item identifier.

2. The apparatus of claim 1, wherein each dataset comprises a plurality of composite multi-character expressions, each composite multi-character expression comprising a said first multi-character expression and the respective associated second multi-character expression.

3. The apparatus of claim 1, wherein the second multi-character expression is configured to limit the type of responses available for entry into the corresponding data input field.

4. The apparatus of claim 1, wherein the apparatus is configured to store each response provided to each data input field in a database in association with the corresponding second multi-character expression and the respective associated first multi-character expression.

5. The apparatus of claim 4, wherein the apparatus is configured to store each response provided in association with a subject identifier identifying the subject of the form.

6. The apparatus of claim 1, wherein the apparatus is configured to:
    when a form is initialised for a subject, provide default responses to respondent prompts using responses which have been supplied previously for the subject.

7. The apparatus of claim 1, wherein the multi-character expression comprises a response character, the response character representing a response of a respondent to the data input field represented by the one or more field characters of the multi-character expression.

8. The apparatus of claim 1, wherein the multi-character expression comprises an instance character, the instance character representing an instance of a form of a particular domain.

9. The apparatus of claim 1, wherein at least some field characters corresponding to the same data input field are configured to be the same regardless of the domain.

10. The apparatus of claim 1, wherein the processing of multi-character expression comprises:
    generating a said multi-character expression for each new data input field, for each new respondent prompt, or for each new data entry response.

11. The apparatus of claim 1, wherein variations of fields in the form comprise one or more of:
    removal of one or more data input fields; and addition of one or more data input fields.

12. The apparatus of claim 1, wherein each of the characters has a predetermined position and format within the data expression which is independent of the domain.

13. The apparatus of claim 1, wherein each multi-character expression is associated with an interpretation.

14. The apparatus of claim 1, wherein the data entry fields of the form are each represented by a separate multi-character expression, the respective multi-character expressions each having one or more domain characters and one or more field characters.

15. A method for processing multiple forms, wherein each form comprises at least one data input field and each data input field is configured to enable a respondent to enter input data into the form, the method comprising:
    processing a multi-character expression comprising:
        a form type;
        one or more domain characters, wherein the one or more domain characters are indicative of variations between different forms of the same form type; and one or more field characters representing at least one data input field of the form, wherein the one or more domain characters represents a domain of the form or a domain of at least one of the one or more field characters, and is indicative of variations in one or more of:

data input fields in the form;

discrete values of possible data inputs; and validation logic associated with the at least one data input field;

wherein the processing the multi-character expression comprises:

querying a database, the database comprising one or more multi-character expressions, wherein the querying comprises:

comparing multi-character expressions stored in the database with a multi-character query expression, the multi-character query expression comprising characters that are deterministic to the query and characters that are not deterministic to the query; and returning a record in the database that matches the deterministic characters in the multi-character query expression, wherein the structure of each form is defined by a dataset, the dataset comprising:

a plurality of first multi-character expressions, each first multi-character expression defining a respondent prompt; and respective associated second multi-character expressions, each second multi-character expression defining a data input field; and wherein the dataset comprises a form item identifier for each combination of a said first multi-character expression and respective associated second multi-character expression, and wherein validation logic is associated with said form item identifier.

16. A non-transitory storage medium comprising a computer program for processing multiple forms, wherein each form comprises at least one data input field and each data input field is configured to enable a respondent to enter input data into the form, the computer program comprising computer program code configured to, when executed by at least one processor:

process a multi-character expression comprising:

a form type;

one or more domain characters, wherein the one or more domain characters are indicative of variations between different forms of the same form type; and one or more field characters representing at least one data input field of the form, wherein the one or more domain characters represents a domain of the form or a domain of at least one of the one or more field characters, and is indicative of variations in one or more of:

data input fields in the form;

discrete values of possible data inputs; and validation logic associated with the at least one data input field;

wherein processing the multi-character expression comprises:

querying a database, the database comprising one or more multi-character expressions, wherein the querying comprises:

comparing multi-character expressions stored in the database with a multi-character query expression, the multi-character query expression comprising characters that are deterministic to the query and characters that are not deterministic to the query; and returning a record in the database that matches the deterministic characters in the multi-character query expression, wherein the structure of each form is defined by a dataset, the dataset comprising:

a plurality of first multi-character expressions, each first multi-character expression defining a respondent prompt; and respective associated second multi-character expressions, each second multi-character expression defining a data input field; and wherein the dataset comprises a form item identifier for each combination of a said first multi-character expression and respective associated second multi-character expression, and wherein validation logic is associated with said form item identifier.

\* \* \* \* \*